(12) United States Patent
Sullivan et al.

(10) Patent No.: US 9,015,226 B2
(45) Date of Patent: Apr. 21, 2015

(54) TECHNIQUES FOR DETECTING NEW BROWSER WINDOWS

(75) Inventors: Blake Sullivan, Redwood City, CA (US); Yuan Gao, San Mateo, CA (US); Hongbing Wang, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 442 days.

(21) Appl. No.: 12/985,799

(22) Filed: Jan. 6, 2011

(65) Prior Publication Data

US 2012/0179743 A1     Jul. 12, 2012

(51) Int. Cl.
   *G06F 15/16*     (2006.01)
   *G06F 17/30*     (2006.01)

(52) U.S. Cl.
   CPC .............. *G06F 17/30861* (2013.01)

(58) Field of Classification Search
   CPC .......... G06F 17/30861; G06F 17/30899; H04L 29/06; H04L 67/14; H04L 67/02; H04L 67/34; H04L 69/329
   USPC ........... 709/203, 208, 217–219, 227–229; 715/749, 803
   See application file for complete search history.

(56) References Cited

U.S. PATENT DOCUMENTS

| | | | |
|---|---|---|---|
| 5,708,806 A | 1/1998 | DeRose et al. | |
| 5,970,496 A | 10/1999 | Katzenberger | |
| 6,052,730 A | 4/2000 | Felciano et al. | |
| 6,061,697 A | 5/2000 | Nakao | |
| 6,418,471 B1 | 7/2002 | Shelton et al. | |
| 6,427,123 B1 | 7/2002 | Sedlar | |
| 6,654,734 B1 | 11/2003 | Mani et al. | |
| 6,981,218 B1 | 12/2005 | Nagao | |
| 6,990,632 B2 | 1/2006 | Rothchiller et al. | |
| 7,024,622 B1 | 4/2006 | Young | |
| 7,124,358 B2 | 10/2006 | Carpenter | |
| 7,237,192 B1 | 6/2007 | Stephenson et al. | |

(Continued)

FOREIGN PATENT DOCUMENTS

| EP | 1041496 A2 | 10/2000 |
|---|---|---|
| WO | 2012094339 A1 | 7/2012 |
| WO | 2012154221 A1 | 11/2012 |

OTHER PUBLICATIONS

Bytes tech community (creating browser tab specific cookie, Dec. 27, 2009, http://bytes.com/topic/javascript/answers/878108-creating-browser-tab-specific-cookie, Feb. 25, 2013).*

(Continued)

*Primary Examiner* — Liangche A Wang
*Assistant Examiner* — Abdulkader M Alriyashi
(74) *Attorney, Agent, or Firm* — Kilpatrick Townsend & Stockton, LLP (57) ABSTRACT

Embodiments of the present invention provide techniques for tracking the lifecycles of client-side browser windows in the context of a web application. In one set of embodiments, a server component of a web application can receive a request originating from a client-side browser window, where the request includes a resource locator (e.g., a URL) and a window identifier. In response, the server component can send a script to the window for retrieving the window's actual identifier/name. Based on the actual identifier returned by the script and the window identifier included in the initial request, the server component can determine whether the window is a new window or an existing window and can process the request as appropriate.

9 Claims, 9 Drawing Sheets

(56) References Cited

U.S. PATENT DOCUMENTS

| | | | |
|---|---|---|---|
| 7,444,374 B1 | 10/2008 | Baker | |
| 7,716,322 B2 | 5/2010 | Benedikt et al. | |
| 7,934,201 B2 | 4/2011 | Sweis | |
| 8,103,913 B2 | 1/2012 | Zambrana | |
| 2002/0087596 A1 | 7/2002 | Lewontin | |
| 2002/0147748 A1 | 10/2002 | Huang et al. | |
| 2003/0009562 A1 | 1/2003 | Heymann et al. | |
| 2003/0037108 A1* | 2/2003 | Peiffer et al. | 709/203 |
| 2003/0221162 A1 | 11/2003 | Sridhar | |
| 2003/0233420 A1 | 12/2003 | Stark et al. | |
| 2004/0133563 A1* | 7/2004 | Harvey et al. | 707/3 |
| 2004/0193699 A1 | 9/2004 | Heymann | |
| 2005/0071464 A1 | 3/2005 | Kuwata et al. | |
| 2005/0091510 A1 | 4/2005 | McKeon et al. | |
| 2005/0228621 A1* | 10/2005 | Matsuo et al. | 703/1 |
| 2006/0005132 A1 | 1/2006 | Herdeg | |
| 2006/0031781 A1 | 2/2006 | Keohane et al. | |
| 2006/0048096 A1 | 3/2006 | Jiang et al. | |
| 2006/0242563 A1 | 10/2006 | Liu et al. | |
| 2006/0279571 A1 | 12/2006 | Mori et al. | |
| 2007/0043701 A1 | 2/2007 | Klementiev et al. | |
| 2007/0240118 A1 | 10/2007 | Keren | |
| 2007/0245231 A1 | 10/2007 | Kibler | |
| 2007/0250601 A1* | 10/2007 | Amlekar et al. | 709/219 |
| 2007/0271382 A1* | 11/2007 | Douiri et al. | 709/227 |
| 2008/0092119 A1 | 4/2008 | Sweis | |
| 2008/0172598 A1 | 7/2008 | Jacobsen et al. | |
| 2008/0183753 A1 | 7/2008 | Maes | |
| 2008/0195819 A1* | 8/2008 | Dumont | 711/138 |
| 2008/0313659 A1 | 12/2008 | Eide et al. | |
| 2008/0317347 A1 | 12/2008 | Lim et al. | |
| 2009/0006627 A1 | 1/2009 | Castellucci et al. | |
| 2009/0030620 A1 | 1/2009 | Novo et al. | |
| 2009/0049427 A1 | 2/2009 | Zhao | |
| 2009/0106769 A1 | 4/2009 | Nakamura | |
| 2009/0198787 A1* | 8/2009 | Broda et al. | 709/209 |
| 2009/0210498 A1 | 8/2009 | Sze et al. | |
| 2009/0235159 A1 | 9/2009 | Hosoda | |
| 2009/0276488 A1 | 11/2009 | Alstad | |
| 2010/0031153 A1* | 2/2010 | Ortwein et al. | 715/733 |
| 2010/0174981 A1 | 7/2010 | Jiang et al. | |
| 2010/0211893 A1 | 8/2010 | Fanning et al. | |
| 2010/0332920 A1* | 12/2010 | Ashida et al. | 714/57 |
| 2011/0004665 A1 | 1/2011 | Kim et al. | |
| 2011/0022948 A1 | 1/2011 | Brown et al. | |
| 2011/0137973 A1 | 6/2011 | Wei et al. | |
| 2011/0145698 A1 | 6/2011 | Penov et al. | |
| 2011/0173589 A1 | 7/2011 | Guttman et al. | |
| 2011/0191676 A1 | 8/2011 | Guttman et al. | |
| 2011/0239104 A1 | 9/2011 | Prasad et al. | |
| 2011/0271173 A1 | 11/2011 | Aït-Mokhtar et al. | |
| 2012/0084133 A1 | 4/2012 | Ross et al. | |
| 2012/0102392 A1 | 4/2012 | Reesman et al. | |
| 2012/0179743 A1 | 7/2012 | Sullivan et al. | |
| 2012/0204091 A1 | 8/2012 | Sullivan et al. | |
| 2012/0278700 A1 | 11/2012 | Sullivan et al. | |

OTHER PUBLICATIONS

U.S. Appl. No. 12/985,805, filed Jan. 6, 2011, Sullivan et al.
Allen, D. "Seamless JSF, Part 2: Conversations with Seam", DeveloperWorks, May 1, 2007, 16 pages.
Jiang, C. "BigPipe: Pipelining web pages for high performance", Jun. 4, 2010, 5 pages.
Chapter 6. Conversations and workspace management, downloaded from Internet http://docs.jboss.org/seam/1.1GA/reference/ec/html/conversations.html on Oct. 3, 2011, 10 pages.
Final Office Action for U.S. Appl. No. 10/136,698 mailed Aug. 23, 2005, 12 pages.
Final Office Action for U.S. Appl. No. 10/136,698 mailed Nov. 15, 2006, 26 pages.
Final Office Action for U.S. Appl. No. 13/021,668 mailed Jan. 16, 2013; 11 pages.
Final Office Action for U.S. Appl. No. 13/094,549 mailed Jan. 18, 2013; 10 pages.
Non-Final Office action for U.S. Appl. No. 10/136,698 mailed Feb. 9, 2005, 13 pages.
Non-Final Office action for U.S. Appl. No. 10/136,698 mailed Apr. 11, 2006, 10 pages.
Non-Final Office Action for U.S. Appl. No. 13/021,668 mailed Aug. 2, 2012; 10 pages.
Non-Final Office Action for U.S. Appl. No. 13/094,549 mailed Aug. 6, 2012; 9 pages.
Non-Final Office Action for U.S. Appl. No. 12/985,805 mailed Feb. 25, 2013; 13 pages.
Notice of Allowance for U.S. Appl. No. 10/136,698 mailed Apr. 18, 2007, 2006, 7 pages.
Brown et al., "XML Schema: Formal Description", <http://www.w3.org/TR/2001/TR-xmlschema-formal/>, Sep. 25, 2001, pp. 1-74.
Ducharme, "Finding Relatives", <http://www.xml.com/lpt/a/2000/10/04/transforming/trxml5.html/>, Oct. 4, 2000, pp. 1-5.
Fallside, "XML Schema Part 0: Primer", <http://www.w3.org/TR/2001/REC-xmlschema-0-2001-0502/>, May 2, 2001, pp. 1-74.
Hampton, "Perl XML Quickstart: The Standard SML Interfaces", <http://www.xml.com/lpt/a/2001/05/16/perlxml.html/>, May 16, 2001, pp. 1-5.
Ogbuji, "Validation XML with Schematron", <http://www.xml.com/lpt/a/2000/11//22/schematron.html/>, Nov. 22, 2000, pp. 1-6.
International Search Report and Written Opinion for PCT Application No. PCT/US2012/020104 mailed on Apr. 20, 2012; 12 pages.
International Search Report and Written Opinion for PCT Application No. PCT/US2012/020106 mailed on Mar. 7, 2012; 16 pages.
Ray et al., "Perl and XML", O'Reilly & Associates, Inc., First Edition, Apr. 1, 2002, pp. 16-18, 29-33, 118-119, 153-155.
Singh et al., "RE:[xsl] getting the node position in source xml in a variable", http://www.xslt.com/html/xsl-list/2002-02/msg01283.html, Feb. 27, 2002, pp. 1-2.
St. Laurent, "On Display: XMLWeb Pages with Mozilla", <http://www.xml.com/lpt/a/2000/03/29/tutorial/index.html/>, Mar. 29, 2000, pp. 1-9.
Tang et al., "Closed-loop load balancing: comparison of a discrete event simulation with experiments", American Control Conference, Proceedings of the 2005 Portland, OR, USA Jun. 8-10, 2005, IEEE, Piscataway, NJ, USA, pp. 2721-2726.
Van Der Vlist, "Comparing XML Schema Languages", <http://www.xml.com/lpt/a/2001/12/12/schemacompare.html/>, Dec. 12, 2001, pp. 1-15.
Van Der Vlist, "XML Linking Technologies", <http://www.xml.com/lpt/a/2001/10/04/linking/index.html/>, Oct. 4, 2000, pp. 1-15.
Wessendorf, "Introduction to Oracle's ADF Faces Rich Client Framework", Jan. 22, 2009, pp. 1-5.
U.S. Appl. No. 12/985,805, "Notice of Allowance", Jul. 22, 2014, 9 pages.
U.S. Appl. No. 13/021,668, "Notice of Allowance", Sep. 9, 2014, 21 pages.
U.S. Appl. No. 13/094,549, "Non-Final Office action", Oct. 6, 2014, 15 pages.
Final Office Action for U.S. Appl. No. 12/985,805 mailed Sep. 10, 2013, 15 pages.
Non-Final Office Action for U.S. Appl. No. 12/985,805 mailed Feb. 21, 2014, 13 paages.

* cited by examiner

TECHNIQUES FOR DETECTING NEW BROWSER WINDOWS

CROSS-REFERENCES TO RELATED APPLICATIONS

The present disclosure is related to the following commonly assigned, co-pending U.S. patent application, which is incorporated herein by reference in its entirety for all purposes: U.S. application Ser. No. 12/985,505, filed concurrently with the present application, entitled "TECHNIQUES FOR DETECTING INACTIVE BROWSER WINDOWS."

BACKGROUND

The present disclosure relates in general to web applications, and in particular to techniques for tracking the lifecycles of client-side browser windows in such applications.

Generally speaking, a web application is a software application that is hosted on a server and is accessible by users via a client-side web browser. In a typical use case, a user opens a client-side browser window and navigates to an initial web page of the application. From there, the user can input information (e.g., via form elements embedded in the page markup) and/or navigate to additional pages of the application to complete some task or transaction.

In some instances, the user may open a new browser window from the context of an existing browser window while accessing the application. This causes the browser to send a new request to the server for the application page displayed in the existing window. In current implementations, the server generally cannot distinguish between this new window event and a situation where the user has reloaded/refreshed the existing window—in either case, the request received by the server appears to originate from the existing window. This can be problematic since the server typically maintains separate application state information for each browser window, and accordingly needs to know which window it is serving before rendering a page. For example, if the server erroneously determines that a client request corresponds to a reload of an existing window (when it actually corresponds to the opening of a new window), the server may unintentionally modify the application state of the existing window when processing the request.

In other instances, the user may close a browser window that he/she has used for accessing the application, or navigate away from the application (e.g., to a third party web site) within the window. In current implementations, the server generally cannot distinguish between these situations and a situation where the user has navigated (within the window) to another web page in the same application—in either case, the server simply receives a notification from the browser that the application page in the window has been unloaded/destroyed. This can make it difficult for the server to determine when to free memory resources (e.g., application state information) that are maintained by the server for each browser window. For example, if the server erroneously determines that a browser window is still being used to access the application (when the user has actually closed the window or navigated away from the application), the server may keep the resources for the window in memory longer than necessary, which is undesirable from both an efficiency and security standpoint.

BRIEF SUMMARY

Embodiments of the present invention provide techniques for tracking the lifecycles of client-side browser windows in the context of a web application. In one set of embodiments, a server component of a web application can receive a request originating from a client-side browser window, where the request includes a resource locator (e.g., a URL) and a window identifier. In response, the server component can send a script to the window for retrieving the window's actual identifier/name. Based on the actual identifier returned by the script and the window identifier included in the initial request, the server component can determine whether the window is a new window or an existing window and can process the request as appropriate.

In another set of embodiments, the server component can receive a notification that an application page in a first client-side browser window has been unloaded/destroyed. In response, the server component can associate the first window with an expiration time and can add the first window to an "expiration" list of windows that are potentially inactive (i.e., closed or no longer being used to accessing the application). If a new request is received by the server component from the first window while the first window is in the expiration list, the server component can identify the first window as active (i.e., still being used to accessing the application) and remove it from the list. If a new request is received by the server component from a second window while the first window is in the expiration list, the server component can compare the time at which the request from the second window was received with the expiration time associated with the first window. If the time of the request is later than the expiration time, the server component can identify the first window as inactive and free all resources associated with the first window.

In yet another set of embodiments, the server component can receive a notification that an application page in the last remaining window for the client-side browser has been unloaded/destroyed. In response, the server component can modify a session timeout variable for a user session associated with the browser from a first duration (e.g., one hour) to a second duration shorter that the first duration (e.g., ten minutes). The server component can then begin a countdown of the session timeout variable. If a request is received by the server component from the last remaining window before the second duration expires, the server component can identify the window as active and reset the session timeout variable to the first duration. If no request is received from the last remaining window before the second duration expires, the server component can identify the window as inactive, free all resources associated with the window, and free all resources associated with the user session.

According to one embodiment of the present invention, a method is provided that comprises receiving, by a server computer system, a first request originating from a window of a web browser running on a client computer system, the first request including a Uniform Resource Locator (URL) and a first window identifier; generating, by the server computer system, a loopback identifier; and storing, by the server computer system, the loopback identifier in a user session associated with the request. The method further comprises generating, by the server computer system, a script that includes the URL, the first window identifier, and the loopback identifier; and sending, by the server computer system, the script to the window that originated the first request.

In one embodiment, the script is executable by the web browser running on the client computer system to facilitate determination of whether the window that originated the first request is a new window or an existing window.

In one embodiment, the loopback identifier is a randomly generated number.

In one embodiment, the first request is a Hypertext Transfer Protocol (HTTP) request.

In one embodiment, the script is sent to the window that originated the first request only if the first request is an HTTP GET or HEAD request.

In one embodiment, the script is configured to, on the client computer system, determine whether the first window identifier matches an identifier of the window that originated the first request, and based on the determining, send a second request to the server computer system.

In one embodiment, if the first window identifier matches an identifier of the window that originated the first request, the second request includes the URL, the loopback identifier, and the first window identifier.

In one embodiment, if the first window identifier does not match an identifier of the window that originated the first request, the second request includes the URL, the loopback identifier, and a second window identifier distinct from the first window identifier.

In one embodiment, the method further comprises receiving, by the server computer system, the second request; matching, by the server computer system, the loopback identifier included in the second request with the loopback identifier stored in the user session; and removing the loopback identifier from the user session.

In one embodiment, the method further comprises, if the second request includes the first window identifier, determining, by the server computer system, that the window that originated the first request is a new window; and if the second request includes the second window identifier, determining, by the server computer system, that the window that originated the first request is an existing window.

In one embodiment, the method further comprises rendering, by the server computer system, content for the URL based on whether the window that originated the first request is a new window or an existing window; and sending, by the server computer system, the rendered content to the window that originated the first request.

According to another embodiment of the present invention, a non-transitory computer readable storage medium is provided having stored thereon instructions executable by a processor. The instructions comprise instructions that cause the processor to receive a first request originating from a window of a web browser running on a client computer system, the first request including a Uniform Resource Locator (URL) and a first window identifier; instructions that cause the processor to generate a loopback identifier; and instructions that cause the processor to store the loopback identifier in a user session associated with the request. The instructions further comprise instructions that cause the processor to generate a script that includes the URL, the first window identifier, and the loopback identifier; and instructions that cause the processor to send the script to the window that originated the first request.

According to another embodiment of the present invention, a server computer system is provided comprising a processor configured to receive a first request originating from a window of a web browser running on a client computer system, the first request including a Uniform Resource Locator (URL) and a first window identifier; generate a loopback identifier; and store the loopback identifier in a user session associated with the request. The processor is further configured to generate a script that includes the URL, the first window identifier, and the loopback identifier; and send the script to the window that originated the first request.

A further understanding of the nature and advantages of the embodiments disclosed herein can be realized by reference to the remaining portions of the specification and the attached drawings.

DETAILED DESCRIPTION

In the following description, for the purposes of explanation, numerous details are set forth in order to provide an understanding of embodiments of the present invention. It will be apparent, however, to one of ordinary skill in the art that certain embodiments can be practiced without some of these details.

Embodiments of the present invention provide techniques for tracking the lifecycles of client-side browser windows in the context of a web application. In one set of embodiments, a server component of a web application can receive a request originating from a client-side browser window, where the request includes a resource locator (e.g., a URL) and a window identifier. In response, the server component can send a script to the window for retrieving the window's actual identifier/name. Based on the actual identifier returned by the script and the window identifier included in the initial request, the server component can determine whether the window is a new window or an existing window and can process the request as appropriate.

In another set of embodiments, the server component can receive a notification that an application page in a first client-side browser window has been unloaded/destroyed. In response, the server component can associate the first window with an expiration time and can add the first window to an "expiration" list of windows that are potentially inactive (i.e., closed or no longer being used to access the application). If a new request is received by the server component from the first window while the first window is in the expiration list, the server component can identify the first window as active (i.e., still being used to accessing the application) and remove it from the list. If a new request is received by the server component from a second window while the first window is in the expiration list, the server component can compare the time at which the request from the second window was received with the expiration time associated with the first window. If the time of the request is later than the expiration time, the server component can identify the first window as inactive and free all resources associated with the first window.

In yet another set of embodiments, the server component can receive a notification that an application page in the last remaining window for the client-side browser has been unloaded/destroyed. In response, the server component can modify a session timeout variable for a user session associated with the browser from a first duration (e.g., one hour) to a second duration shorter that the first duration (e.g., ten minutes). The server component can then begin a countdown of the session timeout variable. If a request is received by the server component from the last remaining window before the second duration expires, the server component can identify the window as active and reset the session timeout variable to the first duration. If no request is received from the last remaining window before the second duration expires, the server component can identify the window as inactive, free all resources associated with the window, and free all resources associated with the user session.

Figure 1:
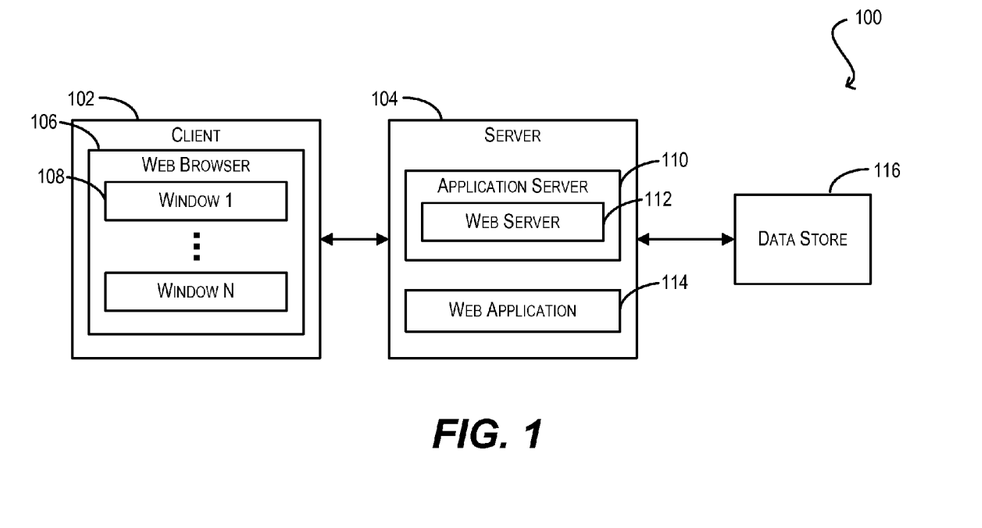
FIG. 1 is a simplified block diagram illustrating a system in accordance with an embodiment of the present invention.

FIG. 1 is a simplified block diagram illustrating a system 100 according to an embodiment of the present invention. As shown, system 100 can include a client 102 in communication with a server 104. Client 102 can be any type of electronic device or system (e.g., desktop computer, laptop computer, tablet computer, smartphone, personal digital assistant (PDA), set-top box, video game system, etc.) capable of running a web browser 106. Examples of available web browsers include Mozilla Firefox, Microsoft Internet Explorer, Google Chrome, Apple Safari, and the like. In various embodiments, web browser 106 can be operated by one or more users of client 102 to access web resources, such as a web application hosted by server 104.

In certain embodiments, web browser 106 can enable users to access multiple web resources simultaneously via multiple browser windows 108. For example, a user can open a first browser window in browser 106 and navigate to a first web page "A". From the context of the first browser window, the user can open one or more additional (new) browser windows, thereby causing additional instances of web page A to be retrieved and rendered in the new windows. From there, the user can navigate to other web pages using any of the open windows. The user can also close one or more of the open windows once the user has finished his/her browsing session.

As used herein, the terms "browser window" and "window" can refer to any viewport of browser 106 capable of displaying web content identified by a resource identifier (e.g., a URL). In a particular embodiment, the terms "browser window" and "window" can refer to a browser "tab," although such tabs are not typically considered to be standalone windows.

Server 104 can be any type of electronic device or system capable of hosting a web application such as application 114. In one set of embodiments, server 104 can include an application server component 110 configured to handle interactions between web browser 106 and web application 114 and to provide various services such as dynamic web page creation, load balancing, security, and the like. In a particular embodiment, application server 110 can include a web server component 112 configured to receive Hypertext Transfer Protocol (HTTP) requests from browser 106 of client 102 and to pass those requests to application server 110 and/or application 114 for processing. Web server 112 can also return HTTP responses (e.g., rendered HTML) to browser 106.

In one set of embodiments, application server 110 can be configured to track the lifecycles of client-side browser windows, such as windows 108 of web browser 106. For example, in one embodiment application server 110 can detect when a user of browser 106 has opened a new browser window while accessing application 114, and can distinguish that new window event from a reload/refresh event on an existing browser window. In another embodiment, application server 110 can detect when a user of browser 106 has inactivated a browser window by closing the window or navigating away from application 114, and can distinguish those situations from a situation where the user has merely navigated to another web page of application 114. The specific processing performed by application server 110 in these scenarios is described in detail with respect to FIGS. 2-7 below.

In addition to client 102 and server 104, system 100 can also include a data store 116. Data store 116 can be communicatively coupled with server 104 and can provide data storage services for various components of server 104, such as web application 114. Although server 104 and data store 116 are shown as separate entities in system 100, one of ordinary skill in the art will appreciate that server 104 and data store 116 can correspond to a single physical machine or separate physical machines.

It should be appreciated that FIG. 1 is illustrative and not intended to limit embodiments of the present invention. For example, the various entities of system 100 may each have additional capabilities or include additional components that are not specifically described. In addition, although only one client, one server, and one data store are depicted, any number of such entities can be supported. One of ordinary skill in the art will recognize many variations, modifications, and alternatives.

Detection of New Client-Side Browser Windows

Figure 2:
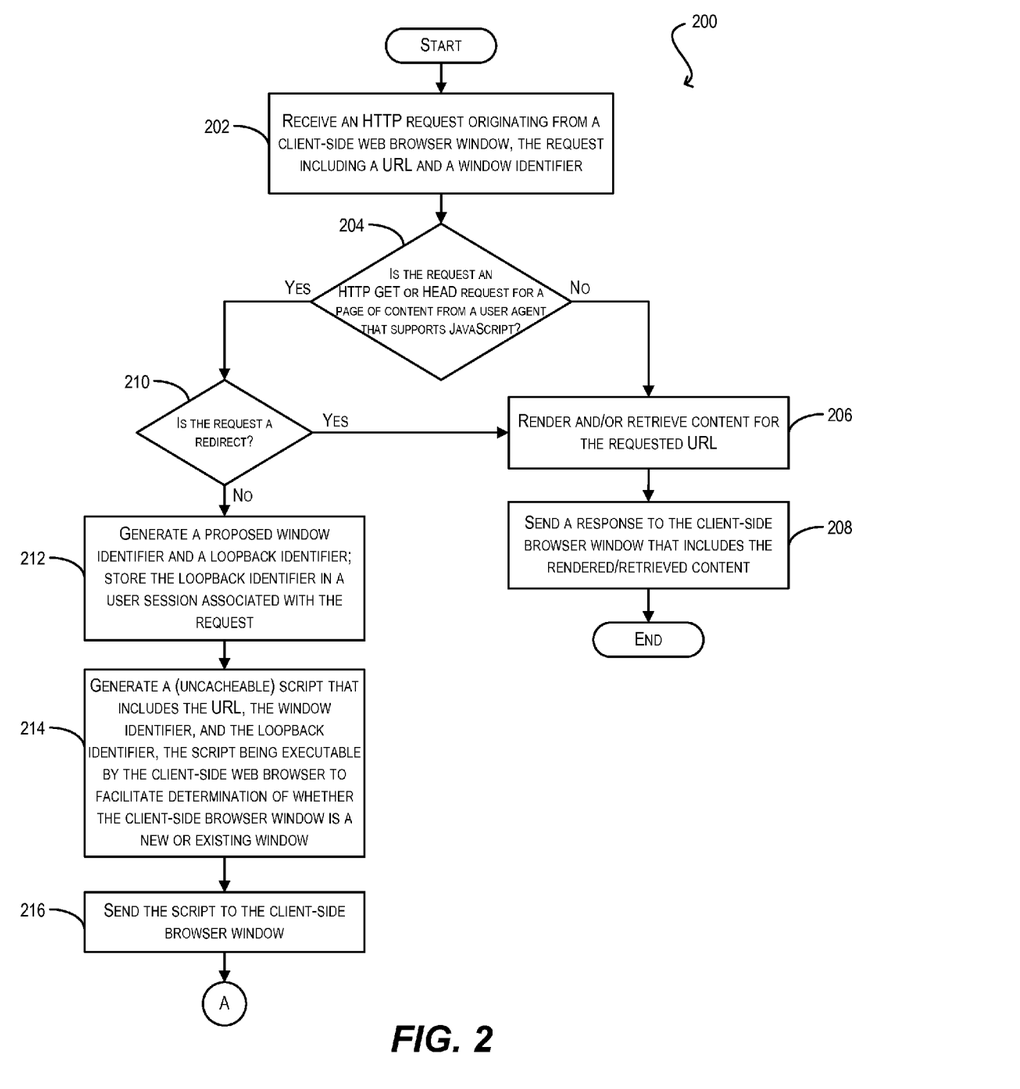
FIG. 2 is a flow diagram illustrating a process for determining whether a client-side browser window is a new window or an existing window in accordance with an embodiment of the present invention.

As indicated above, in certain embodiments application server 110 can determine when a user of browser 106 has opened a new browser window while accessing application 114, and can distinguish that new window event from a reload/refresh event on an existing browser window. FIG. 2 illustrates a process 200 that can be performed by application server 110 for implementing this new window detection according to an embodiment of the present invention. In various embodiments, process 200 can be implemented in hardware, software, or a combination thereof. As software, process 200 can be encoded as program code stored on a machine-readable storage medium.

At block 202, application server 110 can receive an HTTP request originating from a window of client-side web browser 106, where the request is for a resource (e.g., web page) provided by web application 114. In various embodiments, the request can include an identifier of the resource (e.g., a URL), as well as an identifier of a particular browser window. For example, the request can include a URL "X" and a window identifier "Window1." In most situations, the window identifier included in the request will correspond to the identifier of the browser window that originated the request. However, if the request originated from a new window created from the context of an existing window, the window identifier included in the request will correspond to the identifier/name of the existing window rather than the new window. Accordingly, in these cases application server 110 cannot readily discern, based on the window identifier alone, whether the originating window is a new or existing window.

At block 204, application server 110 can determine whether the request is an HTTP GET or HEAD request for a page of content from a user agent that supports JavaScript. If the request does not fall into this particular category, application server 110 can determine that the originating browser window is not a new window. Accordingly, application server 110 can performing its normal processing flow of rendering/retrieving content for the requested URL and sending a response to the browser window with the rendered/retrieved content (blocks 206, 208).

If the request is an HTTP GET or HEAD request for content from a user agent supporting JavaScript, application server 110 can further determine whether the request is a redirect (block 210). If the request is a redirect, application server 110 can perform the processing flow of blocks 206, 208 as described above.

If the request is not a redirect, application server 110 can determine that the request may have originated from a new browser window. In response, application server 110 can generate a proposed window identifier and a loopback identifier, and store the loopback identifier in a user session associated with the request (block 212). In one set of embodiments, the loopback identifier can be a randomly generated number. Application server 110 can further generate a client-side script that includes the loopback identifier, the proposed window identifier, and the URL and window identifier from the received request (e.g., "X" and "Window1"), and can send the script to the originating browser window (blocks 214, 216). In one set of embodiments, the client-side script can be configured to be uncacheable by client-side browser 106. The client-side script can then be executed by browser 106 to retrieve the actual identifier of the originating browser window, thereby facilitating determination of whether the originating window is a new or existing window.

Figure 3:
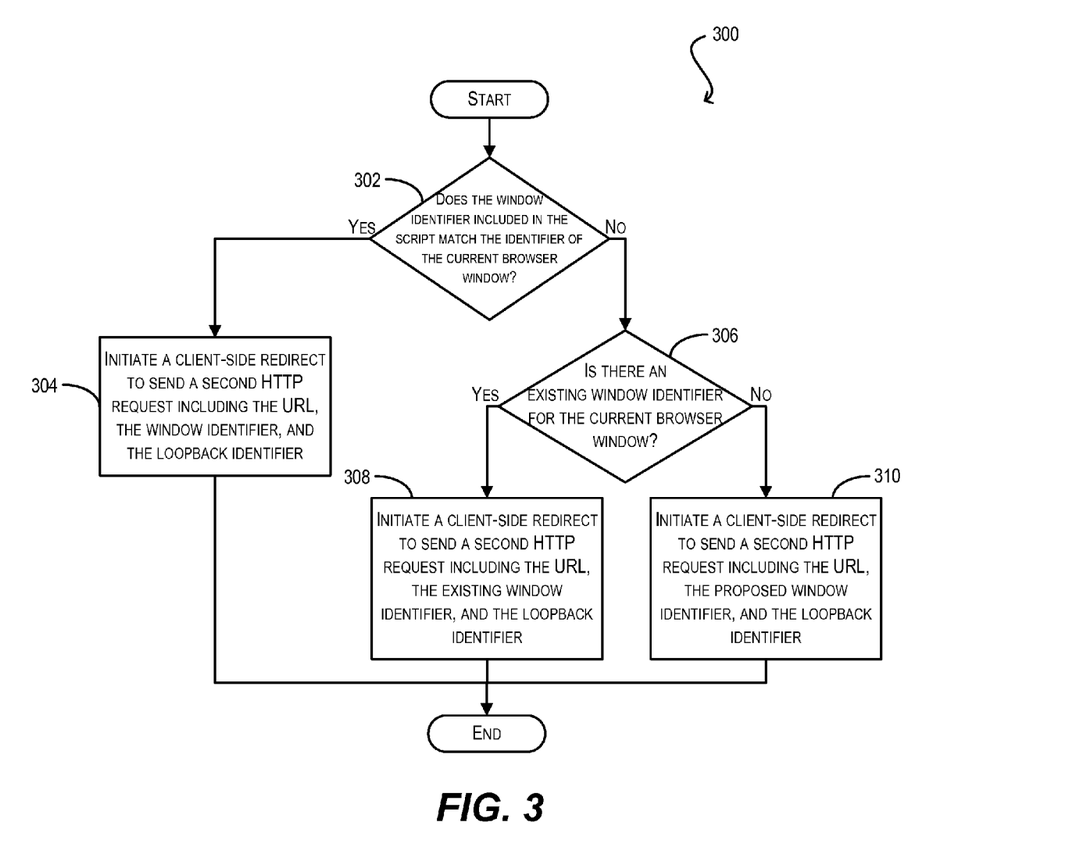
FIG. 3 is a flow diagram illustrating a process performed by a client-side script in accordance with an embodiment of the present invention.

FIG. 3 illustrates a process 300 that can be performed by web browser 106 upon receiving and executing the client-side script sent at block 214. At block 302, browser 106 can determine whether the window identifier included in the script (i.e., the window identifier extracted from the request received at block 202) matches the identifier/name of the current browser window (i.e., the window that originated the request). If the identifiers match, that indicates that the current window is an existing window. In this case, browser 106 can initiate a client-side redirect to send a second HTTP request to server 104 that mirrors the original HTTP request (e.g., includes URL "U1" and window identifier "Window1"), with the addition of the loopback identifier (block 304).

If the identifiers do not match, that indicates that the current window is a new window. In this case, browser 106 can determine whether there already exists a window identifier for the current window (block 306). For example, browser 106 may have automatically assigned a new name/identifier to the window upon opening it. If such an existing identifier is found, browser 106 can initiate a client-side redirect to send a second HTTP request to server 104, wherein the second request includes the loopback identifier, the URL, and the existing identifier (block 308). If an existing window identifier is not found, browser 106 can initiate a client-side redirect to send a second HTTP request that includes the loopback identifier, the URL, and the proposed window identifier generated at block 212 of FIG. 2 (block 310).

Figure 4:
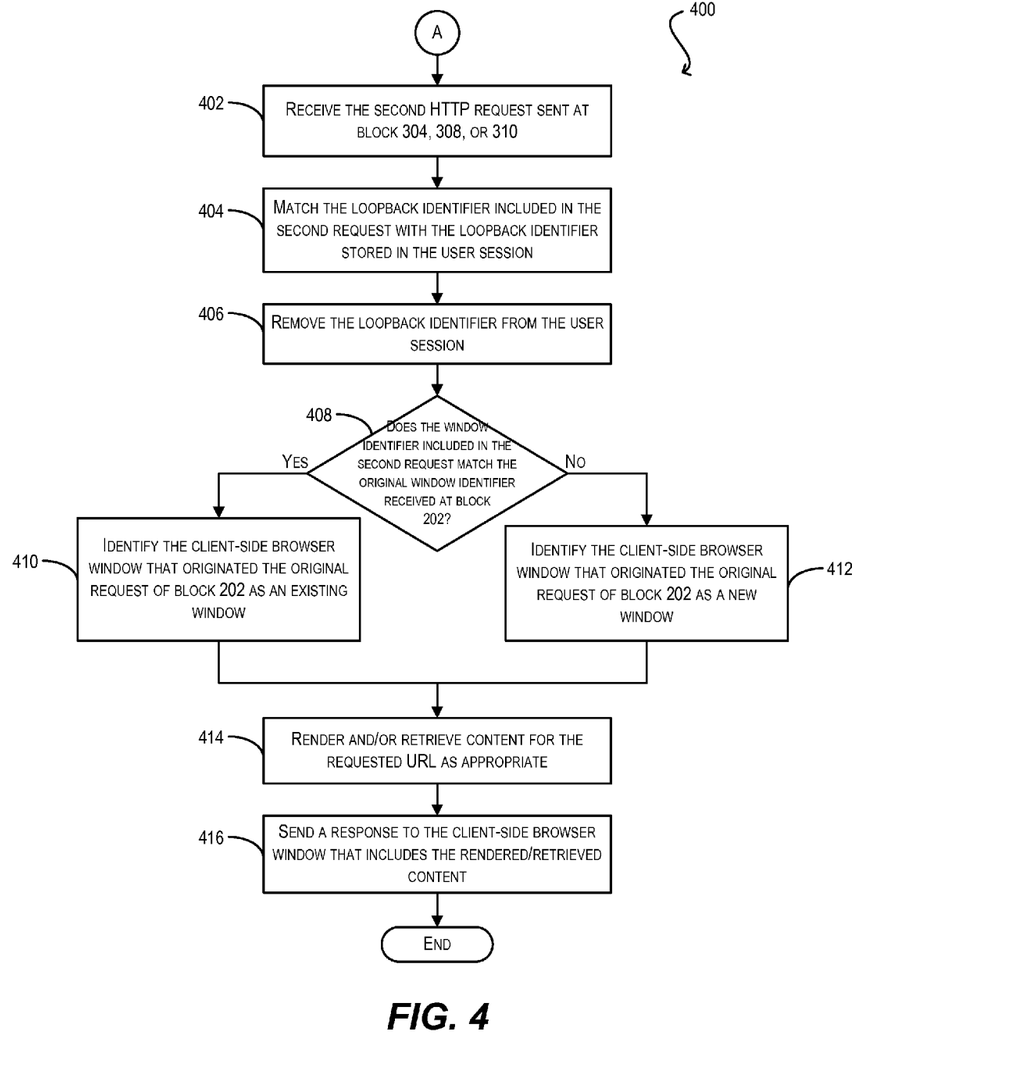
FIG. 4 is a flow diagram illustrating a further process for determining whether a client-side browser window is a new window or an existing window in accordance with an embodiment of the present invention.

Upon receiving the second HTTP request sent by browser 106 at block 304, 308, or 310 of FIG. 3, application server 110 can carry out process 400 of FIG. 4. At blocks 402 and 404, application server 110 can receive the second HTTP request and match the loopback identifier included in the second request with the loopback identifier stored in the user's session. If the loopback identifiers match, the application server knows that this second request was generated in response to the client-side script sent at block 214 (rather than in response to a user action). Accordingly, application server 110 can remove the loopback identifier from the session (block 406) and proceed with the remainder of process 400.

At block 408, application server 110 can determine whether the window identifier included in the second request matches the window identifier included in the original request received at block 202. If the identifiers match, application server 110 can conclude that the window that originated the original request of block 202 is an existing window. Alternatively, if the identifiers do not match, server 104 can conclude that the window that originated the original request of block 202 is a new window. Application server 110 can then process the original request by rendering/retrieving the content for the URL and sending a response to the originating browser window that includes the rendered/retrieved content (blocks 414, 416).

In a particular embodiment, the processing of the original request can differ based on whether the originating window is determined to be a new window or an existing window. For example, if the originating window is determined to be an existing window per block 410, application server 110 can freely update/modify application state information associated with that window. However, if the originating window is determined to be a new window per block 412, application server 110 can take appropriate steps to ensure that the states of any existing windows remain unchanged. In this manner, application server 110 can avoid unintentionally trashing/invalidating the states of those existing windows when processing the request from the new window.

It should be appreciated that processes 200, 300, and 400 are illustrative and that variations and modifications are possible. For example, steps described as sequential may be executed in parallel, order of steps may be varied, and steps may be modified, combined, added, or omitted. One of ordinary skill in the art would recognize many variations, modifications, and alternatives.

Detection of Inactive Client-Side Browser Windows

Figure 5:
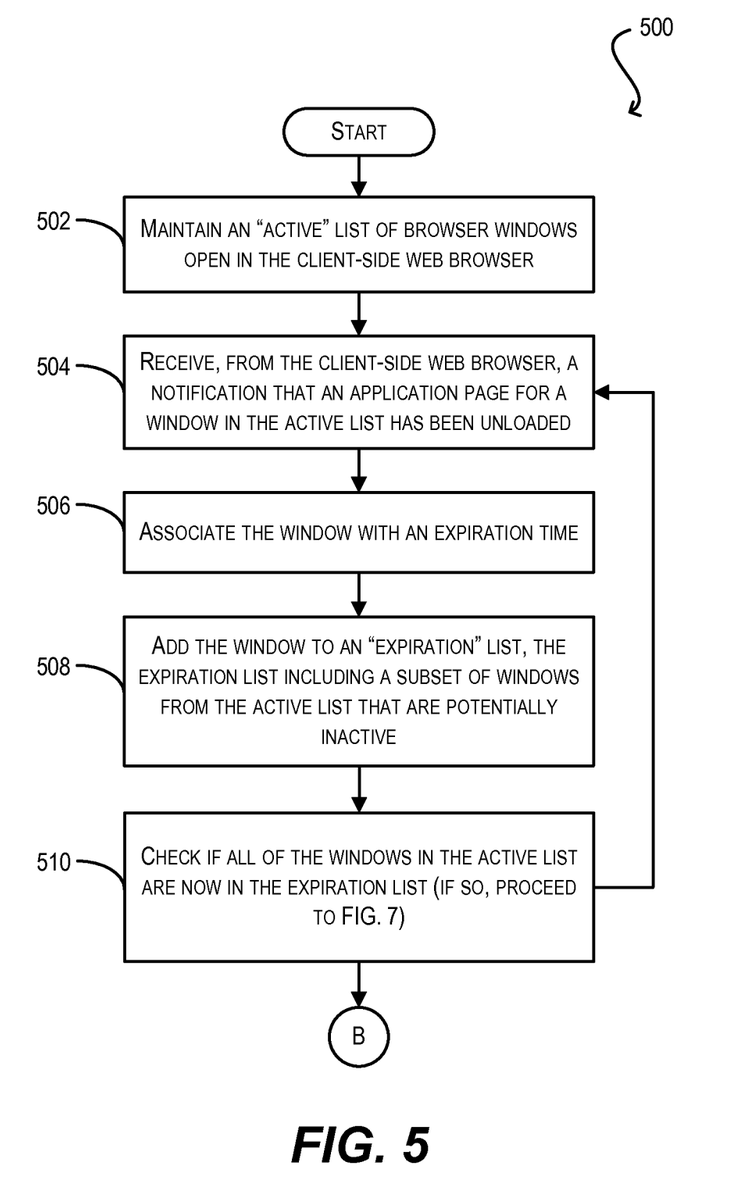
FIG. 5 is a flow diagram illustrating a process for determining whether a client-side browser window is inactive in accordance with an embodiment of the present invention.

In certain embodiments, application server 110 can detect when a user of browser 106 has inactivated a browser window by closing the window or navigating away from application 114, and can distinguish those situations from a case where the user has merely navigated to another web page of application 114. FIG. 5 illustrates a process 500 that can be performed by application server 110 for implementing this inactive window detection according to an embodiment of the present invention. In various embodiments, process 500 can be implemented in hardware, software, or a combination thereof. As software, process 500 can be encoded as program code stored on a machine-readable storage medium.

At block 502, application server 110 can maintain an "active" list of browser windows that are open in web browser 106. From the perspective of application server 110, a browser window is considered "active" if it is being used to access web application 114. The active list can be stored as part of the user session associated with the browser. In one set of embodiments, the entry for each window in the active list can include the window's identifier and an indication of the current page being displayed in the window.

At block 504, application server 110 can receive a notification from browser 106 that an application page in an active browser window has been unloaded/destroyed. Such a notification may be received if, e.g., the window has been closed by a user, or if the user has navigated to a different web page within the window. In response, application server 110 can associate an expiration time with the active window, and can add the window to an "expiration" list of windows that are potentially inactive (i.e., no longer being used to access the application) (blocks 506, 508).

In addition, application server 110 can determine whether all of the windows in the active list are now in the expiration list (block 510). If not, the steps of blocks 504-510 can be repeated as more unload/destroy notifications are received by application server 110, thereby causing additional active windows to be added to the expiration list. If all of the active windows are now in the expiration list, application server 110 can perform special processing to determine whether to free user session-level resources; this processing is discussed with respect to FIG. 7 below.

Figure 6:
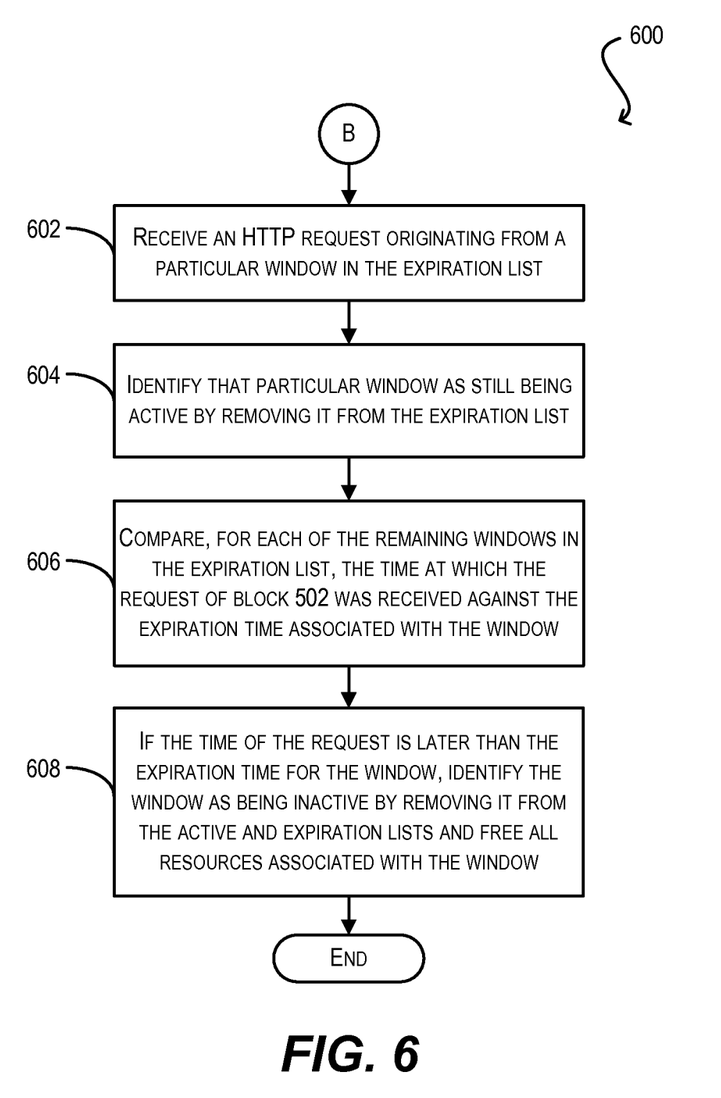
FIG. 6 is a flow diagram illustrating a further process for determining whether a client-side browser window is inactive in accordance with an embodiment of the present invention.

The processing of FIG. 5 is continued in process 600 of FIG. 6. At block 602, application server 110 can receive an HTTP request originating from a particular browser window that was previously placed in the expiration list at block 508. Since the receipt of this request indicates that the window is still being used to access application 114, application server 110 can conclude that the window is still active and can remove it from the expiration list (block 604). Application server 110 can also update the window's entry in the active list with the latest URL included in the received request.

At block 606, application server 110 can go through the remaining windows in the expiration list and compare, for each window, the time at which the request was received at block 602 with the expiration time associated with the window. If the time of the request is later than the expiration time for the window, application server 110 can identify the window as being inactive (i.e., no longer being used to access application 114) and can remove the window from both the active and expiration lists. Application server 110 can also free the memory resources (e.g., application state information, etc.) associated with that window.

If the time of the request is earlier than the expiration time for the window, application server 110 can leave the window in the expiration list. The window can remain in the expiration list until a new request is received from that window (indicating that the window is still active), or until a new request is received from a different window at a time later than the expiration time associated with the window (indicating that the window is most likely inactive).

In some cases when a user navigates from a first application page to a second application page in a browser window, application server 110 may receive a request for the second page before it receives the notification that the first page has been destroyed/unloaded. This is because HTTP does not guarantee that messages are received in the same order in which they were sent. To account for this, in certain embodiments application server 110 can keep track of the current page displayed in each window and can ignore unload notifications that pertain to outdated pages.

For example, assume browser window A is currently displaying application page 1. Further, assume that the user of window A navigates from application page 1 to application page 2, but application server 110 receives the request for (window A, page 2) before the unload notification for (window A, page 1). Once the request for (window A, page 2) is received, application server 110 can update the active window list such that the current page for window A is page 2. When the unload notification for (window A, page 1) is subsequently received, application server 110 can ignore the unload notification since the current page for window A is not page 1 (rather, it is page 2). Thus, this prevents application server 110 from erroneously adding window A to the expiration list upon receiving the unload notification.

It should be appreciated that processes 500 and 600 are illustrative and that variations and modifications are possible. For example, steps described as sequential may be executed in parallel, order of steps may be varied, and steps may be modified, combined, added, or omitted. One of ordinary skill in the art would recognize many variations, modifications, and alternatives.

As noted above, in certain embodiments application server 110 can employ special processing to detect when the last remaining browser window for a user session has been inactivated/closed. This processing is illustrated in process 700 of FIG. 7. In various embodiments, process 700 can be implemented in hardware, software, or a combination thereof. As software, process 700 can be encoded as program code stored on a machine-readable storage medium.

Figure 7:
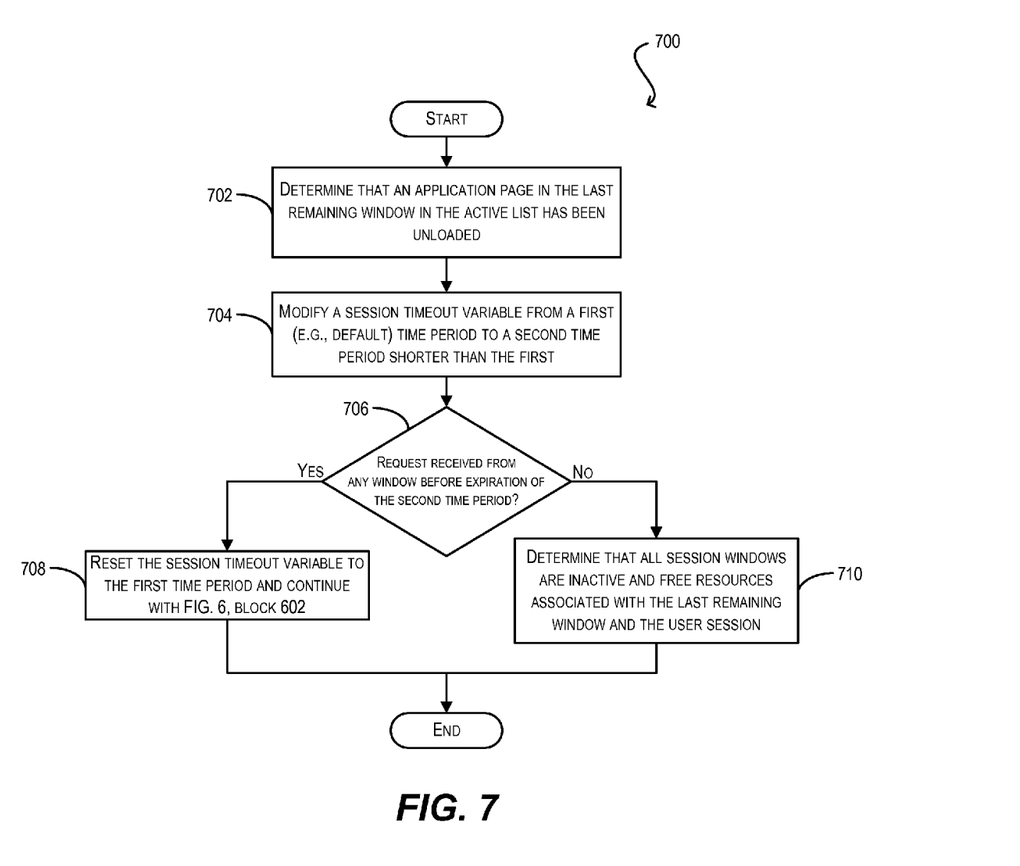
FIG. 7 is a flow diagram illustrating a process for determining whether the last remaining window of a client-side browser is inactive in accordance with an embodiment of the present invention.

At block 702, application server 110 can determine that an application page in the last remaining browser window for a user session (i.e., the last window in the active list) has been unloaded/destroyed. In one set of embodiments, this can be accomplished by comparing the set of windows in the active list and the expiration list are the same. Upon determining that the last remaining browser window has been unloaded/destroyed, application server 110 can modify a session timeout variable associated with the user session from a first time period (e.g., one hour) to a second time period shorter than the first (e.g., ten minutes), and can begin a countdown of the variable (block 704).

If a HTTP request is received from any window before the session timeout variable expires, application server 110 can conclude that the session is still active and can reset the session timeout variable to the first time period (blocks 706, 708). Further, processing can return to block 602 of FIG. 6.

However, if no request is received from any window before the session timeout variable expires, application server 110 can conclude that the last remaining window is inactive (and thus, the entire user session is closed). Accordingly, application server 110 can free all of the resources associated with the window and the user session (block 710).

It should be appreciated that process 700 is illustrative and that variations and modifications are possible. For example, steps described as sequential may be executed in parallel, order of steps may be varied, and steps may be modified, combined, added, or omitted. One of ordinary skill in the art would recognize many variations, modifications, and alternatives.

Figure 8:
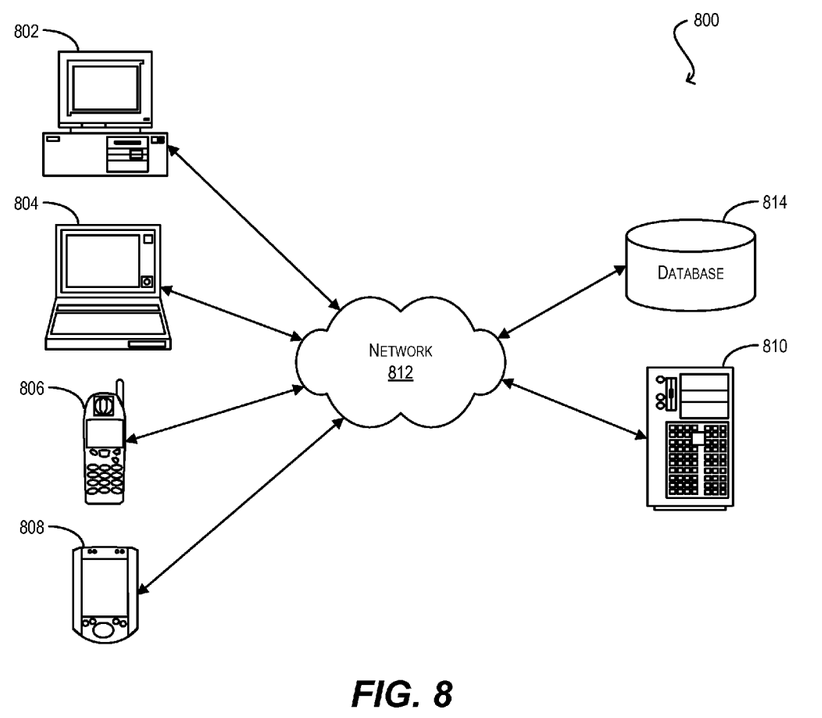
FIG. 8 is a simplified block diagram illustrating a system environment in accordance with an embodiment of the present invention.

FIG. 8 is a simplified block diagram illustrating a system environment 800 according to an embodiment of the present invention. As shown, system environment 800 can include one or more client computer systems 802, 804, 806, 808, a server computer system 810, a network 812, and a database 814. In various embodiments, client computer systems 802, 804, 806, 808, server computer system 810, and database 814 can be used to implement client 102, server 104, and data store 116 of FIG. 1 respectively.

Client computer systems 802, 804, 806, 808 can be general-purpose personal computers (e.g., desktop computers and/or laptop computers), tablet computers, smart phones, PDAs, and/or workstation computers. Alternatively, client computer systems 802, 804, 806, 808 can be any other type of electronic device capable of running a web browser such as browser 106 of FIG. 1. Although system environment 800 is shown with four client computer systems, it should be appreciated that any number of client computer systems can be supported.

Network 812 can be any type of network familiar to those skilled in the art that can support data communications using a network protocol, such as TCP/IP, SNA, IPX, AppleTalk, and the like. Merely by way of example, network 812 can be a local area network (LAN), such as an Ethernet network; a wide-area network; a virtual network, including without limitation a virtual private network (VPN); the Internet; a wireless network (e.g., a network operating under any of the IEEE 802.11 suite of protocols, the Bluetooth protocol known in the art, and/or any other wireless protocol); and/or any combination of these and/or other networks.

Server computer system 810 can be a general purpose computer, a specialized server computer (e.g., PC server, UNIX server, mainframe server, rack-mounted server, etc.), a server cluster, or any other appropriate arrangement and/or combination of computers. Server computer system 810 can run any consumer or server operating system such as Microsoft Windows, Apple OS X, Linux, Solaris, and the like. Server computer system 810 can also run any of a variety of server applications and/or mid-tier applications, including application server 110 and web application 114 of FIG. 1.

Database 814 can reside on a storage medium local to (and/or resident in) one or more of computer systems 802, 804, 806, 808, and 810. Alternatively, database 814 can be remote from any or all of computer systems 802, 804, 806, 808, 810, and/or in communication (e.g., via network 812) with one or more of these. In one set of embodiments, database 814 can reside in a storage-area network (SAN) familiar to those skilled in the art. Similarly, any necessary files for performing the functions attributed to computer systems 802, 804, 806, 808, 810 can be stored locally on the respective computer and/or remotely on database 814, as appropriate. In one set of embodiments, database 814 can be a relational database, such as Oracle 11g available from Oracle Corporation, that is adapted to store, update, and retrieve data in response to SQL-formatted commands.

Figure 9:
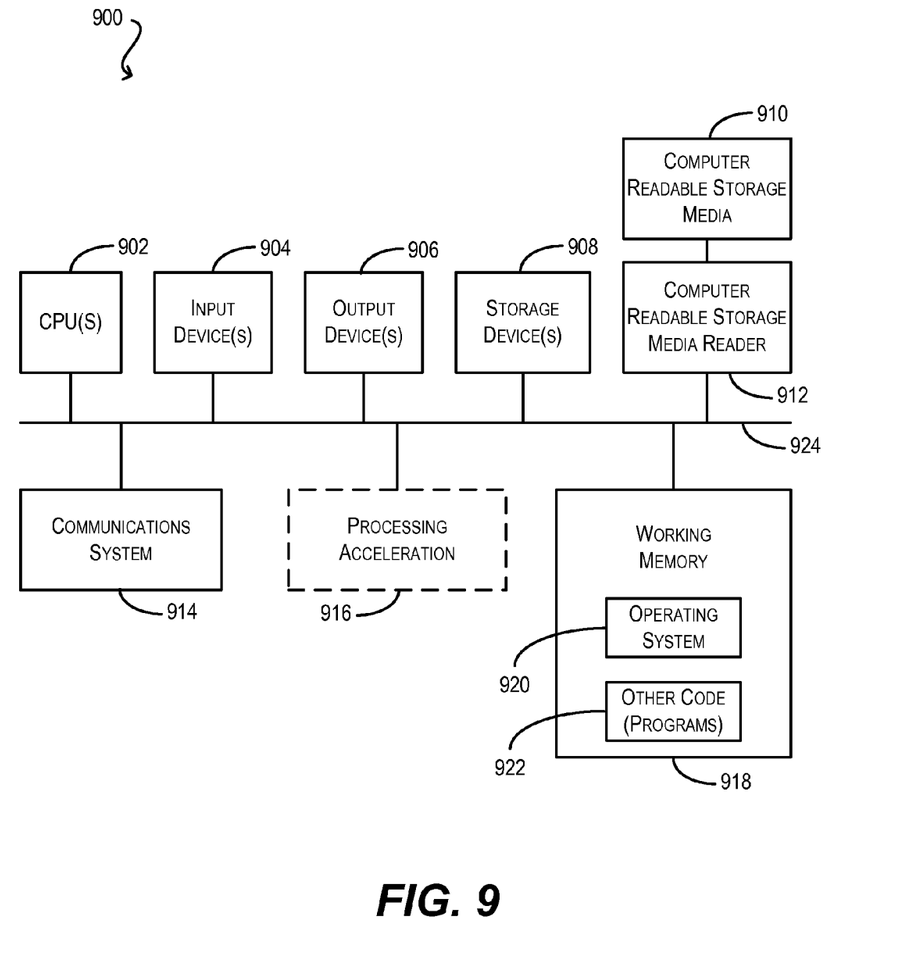
FIG. 9 is a simplified block diagram illustrating a computer system in accordance with an embodiment of the present invention.

FIG. 9 is a simplified block diagram illustrating a computer system 900 according to an embodiment of the present invention. In various embodiments, computer system 900 can be used to implement any of computer systems 802, 804, 806, 808, and 810 described with respect to system environment 800 above. As shown, computer system 900 can include hardware elements that are electrically coupled via a bus 924. The hardware elements can include one or more central processing units (CPUs) 902, one or more input devices 904 (e.g., a mouse, a keyboard, etc.), and one or more output devices 906 (e.g., a display device, a printer, etc.). Computer system 900 can also include one or more storage devices 908. By way of example, the storage device(s) 908 can include devices such as disk drives, optical storage devices, and solid-state storage devices such as a random access memory (RAM) and/or a read-only memory (ROM), which can be programmable, flash-updateable and/or the like.

Computer system 900 can additionally include a computer-readable storage media reader 912, a communications subsystem 914 (e.g., a modem, a network card (wireless or wired), an infra-red communication device, etc.), and working memory 918, which can include RAM and ROM devices as described above. In some embodiments, computer system 900 can also include a processing acceleration unit 916, which can include a digital signal processor (DSP), a special-purpose processor, and/or the like.

Computer-readable storage media reader 912 can be connected to a computer-readable storage medium 910, together (and, optionally, in combination with storage device(s) 908) comprehensively representing remote, local, fixed, and/or removable storage devices plus storage media for temporarily and/or more permanently containing computer-readable information. Communications system 914 can permit data to be exchanged with network 812 and/or any other computer described above with respect to system environment 800.

Computer system 900 can also comprise software elements, shown as being currently located within working memory 918, including an operating system 920 and/or other code 922, such as an application program (which may be a client-side web browser, middle tier/server application, etc.). It should be appreciated that alternative embodiments of computer system 900 can have numerous variations from that described above. For example, customized hardware can be used and particular elements can be implemented in hardware, software, or both. Further, connection to other computing devices such as network input/output devices can be employed.

Computer readable storage media for containing code, or portions of code, executable by computer system 900 can include any appropriate media known or used in the art, such as but not limited to volatile/non-volatile and removable/non-removable media. Examples of computer-readable storage media include RAM, ROM, EEPROM, flash memory, CD-ROM, digital versatile disk (DVD) or other optical storage, magnetic cassettes, magnetic tape, magnetic disk storage or other magnetic storage devices, an any other medium that can be used to store data and/or program code and that can be accessed by a computer.

Although specific embodiments of the invention have been described above, various modifications, alterations, alternative constructions, and equivalents are within the scope of the invention. For example, although embodiments of the present invention have been described with respect to certain flow diagrams and steps, it should be apparent to those skilled in the art that the scope of the present invention is not limited to the described diagrams/steps.

Further, although embodiments of the present invention have been described using a particular combination of hardware and software, it should be recognized that other combinations of hardware and software are also within the scope of the present invention.

The specification and drawings are, accordingly, to be regarded in an illustrative rather than restrictive sense. It will be evident that additions, subtractions, and other modifications may be made thereunto without departing from the broader spirit and scope of the invention as set forth in the following claims.

What is claimed is:

1. A method comprising:
   receiving, by a server computer system, a first request originating from a first window of a web browser running on a client computer system, the first request including a Uniform Resource Locator (URL) and a first window identifier corresponding to the first window;
   receiving, by the server computer system, a second request originating from a second window of the web browser running on the client computer system, the second request including the URL and the first window identifier corresponding to the first window;
   determining whether the second request is an HTTP GET or HTTP HEAD request;
   generating, by the server computer system, a loopback identifier associated with the first request;
   storing, by the server computer system, the loopback identifier in a user session associated with the first request;
   generating, by the server computer system, a script that includes the URL, the first window identifier, and the loopback identifier;

sending, by the server computer system, the script to the second window of the web browser, the script configured to be uncacheable by the client computer system;
enabling the web browser running on the client computer system to execute the script to facilitate determination of whether the second window is a new window or an existing window, the determination comprising a comparison between the first window identifier included in the script and an actual window identifier of the second window; and
enabling transmission of a third request, from the second window, to the server computer system that includes:
the URL, the first window identifier corresponding to the first window, and the loopback identifier when the first window identifier included in the script and the actual window identifier of the second window match; or
the URL, the actual window identifier of the second window, and the loopback identifier when the first window identifier included in the script and the actual window identifier of the second window do not match.

2. The method of claim 1 wherein the loopback identifier is a randomly generated number.

3. The method of claim 1 wherein the first request is a Hypertext Transfer Protocol (HTTP) request.

4. The method of claim 3 wherein the script is sent to the second window if the second request is an HTTP GET or HEAD request.

5. The method of claim 1 further comprising:
receiving, by the server computer system, the third request;
matching, by the server computer system, the loopback identifier included in the third request with the loopback identifier stored in the user session; and
removing the loopback identifier from the user session.

6. The method of claim 5 further comprising:
if the third request includes the actual window identifier, determining, by the server computer system, that the second window is the new window; and
if the third request includes the first window identifier, determining, by the server computer system, that the second window is the existing window.

7. The method of claim 6 further comprising:
rendering, by the server computer system, content for the URL based on whether the second window is the new window or the existing window; and
sending, by the server computer system, the rendered content to the second window.

8. A non-transitory computer readable storage medium having stored thereon instructions executable by a processor, the instructions comprising:
instructions that cause the processor to receive a first request originating from a first window of a web browser running on a client computer system, the first request including a Uniform Resource Locator (URL) and a first window identifier corresponding to the first window;
instructions that cause the processor to receive a second request originating from a second window of the web browser running on the client computer system, the second request including the URL and the first window identifier corresponding to the first window;
instructions that cause the processor to determine whether the second request is an HTTP GET or HTTP HEAD request;
instructions that cause the processor to generate a loopback identifier associated with the first request;
instructions that cause the processor to store the loopback identifier in a user session associated with the first request;
instructions that cause the processor to generate a script that includes the URL, the first window identifier, and the loopback identifier;
instructions that cause the processor to send the script to the second window;
instructions that cause the processor to enable the web browser running on the client computer system to execute the script to facilitate determination of whether the second window is a new window or an existing window, the determination comprising a comparison between the first window identifier included in the script and an actual window identifier of the second window; and
instructions that cause the processor to enable transmission of a third request, from the second window, to the server computer system that includes:
the URL, the first window identifier corresponding to the first window, and the loopback identifier when the first window identifier included in the script and the actual window identifier of the second window match; or
the URL, the actual window identifier of the second window, and the loopback identifier when the first window identifier included in the script and the actual window identifier of the second window do not match.

9. A server computer system comprising:
a processor configured to:
receive a first request originating from a window of a web browser running on a client computer system, the first request including a Uniform Resource Locator (URL) and a first window identifier;
receive a second request originating from a second window of the web browser running on the client computer system, the second request including the URL and the first window identifier corresponding to the first window;
generate a loopback identifier associated with the first request;
store the loopback identifier in a user session associated with the request;
generate a script that includes the URL, the first window identifier, and the loopback identifier;
send the script to the second window of the web browser;
enable the web browser running on the client computer system to execute the script to facilitate determination of whether the second window is a new window or an existing window, the determination comprising a comparison between the first window identifier included in the script and an actual window identifier of the second window; and
enable transmission of a third request, from the second window, to the server computer system that includes:
the URL, the first window identifier corresponding to the first window, and the loopback identifier when the first window identifier included in the script and the actual window identifier of the second window match; or
the URL, the actual window identifier of the second window, and the loopback identifier when the first window identifier included in the script and the actual window identifier of the second window do not match.

* * * * *

UNITED STATES PATENT AND TRADEMARK OFFICE
CERTIFICATE OF CORRECTION

| | | |
|---|---|---|
| PATENT NO. | : 9,015,226 B2 | Page 1 of 1 |
| APPLICATION NO. | : 12/985799 | |
| DATED | : April 21, 2015 | |
| INVENTOR(S) | : Sullivan et al. | |

It is certified that error appears in the above-identified patent and that said Letters Patent is hereby corrected as shown below:

Title Page, item (56)

On page 2, column 2, under Other Publications, line 64, delete "paages." and insert -- pages. --, therefor.

In the Specification

In column 1, line 10, delete "12/985,505," and insert -- 12/985,805, --, therefor.

Signed and Sealed this
Sixteenth Day of February, 2016

Michelle K. Lee
*Director of the United States Patent and Trademark Office*